(12) United States Patent
Suvakovic et al.

(10) Patent No.: US 9,923,842 B2
(45) Date of Patent: Mar. 20, 2018

(54) APPARATUS AND METHOD FOR NETWORK INTERCONNECTION

(71) Applicant: Alcatel-Lucent USA Inc., Murray Hill, NJ (US)

(72) Inventors: Dusan Suvakovic, Pleasanton, CA (US); Adriaan J de Lind Van Wijngaarden, New Providence, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 115 days.

(21) Appl. No.: 14/871,269

(22) Filed: Sep. 30, 2015

(65) Prior Publication Data

US 2016/0268003 A1    Sep. 15, 2016

Related U.S. Application Data

(60) Provisional application No. 62/133,051, filed on Mar. 13, 2015.

(51) Int. Cl.
*H04L 12/935* (2013.01)
*H04L 12/933* (2013.01)

(52) U.S. Cl.
CPC .......... *H04L 49/30* (2013.01); *H04L 49/1515* (2013.01)

(58) Field of Classification Search
None
See application file for complete search history.

(56) References Cited

U.S. PATENT DOCUMENTS

| 6,621,828 B1 * | 9/2003 | Field | H04Q 11/04 370/376 |
| 2002/0176417 A1 * | 11/2002 | Wu | H04L 49/103 370/389 |

* cited by examiner

*Primary Examiner* — Christopher Crutchfield
*Assistant Examiner* — Alan Lindenbaum
(74) *Attorney, Agent, or Firm* — Stephen J. Wyse

(57) ABSTRACT

A network node (bridge, switch, router) and method for traffic interconnection in a communication network. The node includes an interconnection network or switch fabric having ingress and egress ports in communication with the input and output ports of the node. The interconnection network also includes an interconnector having a retiming module, a permutation module, and a re-alignment module. Data arriving at the node input ports is provided to the ingress queues of the interconnection network where it is queued, if necessary, and then processed through the interconnector so that it can be provided to an appropriate egress port. Data at the egress ports is then provided to output ports for transmission toward its intended destination.

4 Claims, 5 Drawing Sheets

APPARATUS AND METHOD FOR NETWORK INTERCONNECTION

CROSS-REFERENCE TO RELATED APPLICATIONS

The present disclosure is related to and claims priority from U.S. Provisional Patent Application Ser. No. 62/133,051, entitled Apparatus and Method for Network Switching and filed on 13 Mar. 2015, the entire contents of which are incorporated by reference herein.

TECHNICAL FIELD

The present disclosure relates generally to the field of communication networks, and more particularly to a switching fabric for facilitating network interconnection switching.

BACKGROUND

The following abbreviations are herewith expanded, at least some of which are referred to within the following description of the state-of-the-art and the present invention.
DP Dual Port [memory]
DRAM Dynamic RAM
IEEE Institute of Electrical and Electronics Engineers
ITU International Telecommunication Union
RAM Random Access Memory
SRAM Static RAM Digital systems typically require rapid movement of data for efficient computing and communications. Interconnection networks are needed to provide high-bandwidth, low-latency communication between nodes in a network. Interconnection networks can be found, for example, in network routers, input/output and storage switches, processor-memory and inter-processor communication networks, and systems-on-a-chip (SoC).

An interconnection network is considered to be non-blocking if it can handle all circuit requests that are a permutation of the inputs and the outputs. This implies that a dedicated path can be formed from each input to its selected output. Crossbar topologies achieve such non-blocking connectivity, but they do not scale very well. The massive growth of digital systems and communication networks puts ever more demanding requirements on its components and its interconnection networks. For instance, in optical transport networks, channels nowadays operate at 100 Gb/s and beyond per wavelength, and accordingly, core and edge routers have to process tremendous amounts of information. This disclosure submission primarily focuses on the design of an interconnection network for switches and routers, but the solutions are also directly applicable to general interconnection networks in digital systems.

A router is typically characterized by the number of input ports, the number of output ports, and the overall throughput. Routers read the header information of each packet and extract the destination address, in order to direct the packet to its destination. Routers typically consist of a large number of line cards and a smaller number of cards with switch fabric.

The switch fabric, which frequently resides in ASICs, is tasked to provide arbitrary connectivity, in parallel, between the input ports and output ports. Incoming traffic is controlled by buffer managers, which typically reside on the line cards, and queue managers, which control the switch fabric.

The switching fabric typically uses a butterfly topology to connect the input ports to the output ports. From the point of a single input port, the butterfly looks like a tree. Each level of the tree contains switching nodes, which pass packets along. Switching fabric is most commonly implemented as a three-stage network, in which each stage is composed of a number of crossbar switches.

Such a network is referred to as a Clos network. A symmetric Clos network is characterized by a 3-tuple (m,n,r), where m denotes the number of middle-stage switches, n denotes the number of input (output) ports on each input (output) switch, and r denotes the number of input and output switches. Every component switch has a parser. Clos networks with more than three stages exist. A Clos network that is composed of 2×2 switches is also referred to as a Benes network.

These networks are generally, but not strictly non-blocking, and they also suffer from excessive control and overhead to make them generally non-blocking. As such, these interconnection networks become ever more complex, do not scale very well, and there are no viable guaranteed non-blocking solutions.

Alternative non-blocking switching architectures, such as the crossbar switch, suffer from poor scalability as their number of connections and buffering resources grows with the square of the number of ports. For all conventional switching architectures, the amount of internal memory is very large and grows faster than linearly with the traffic volume and the number of ports, which makes it difficult to scale such networks.

The technical problem that is addressed in this disclosure then is a need for a non-blocking switch fabric that is scalable, hardware-efficient, and energy-efficient. Currently-used switch fabrics typically do not have a guaranteed non-blocking property, which leads to packet loss, jitter, and latency. Many switch fabric architectures also does not scale very well and require increasingly complicated routing control to have reasonable non-blocking performance One objective of the present solution is to design a new switch fabric architecture that meets stringent requirements on throughput, and strict constraints on latency and power consumption.

These and other problems are addressed by the apparatus and method of the proposed solution. Note that although is provided as background for the description, no admission is made or intended that the information herein is known to others besides the inventors. Note also that while there are certain stated or implied goals or objectives of the proposed solution, no level of performance is a requirement of the claimed invention unless recited explicitly in a particular embodiment.

SUMMARY

The present invention is directed to a manner of interconnecting data traffic in a data communication network. Data arriving at a network-node port is forwarded from a network-node port appropriate its intended destination. In order to accomplish this, the node includes an interconnection network having two memory modules, each memory module including a number of separately-addressable memory banks.

Incoming data words are stored in the first memory module to shift them in time so that a subsequently a sequence of data words may be read out of the first memory module in one clock cycle and stored in the second memory module in such a manner that words grouped by time of arrival may be read out in one cycle and provided to network-node ports. Shifting apparatus may be employed to facilitate storage in appropriate memory banks of the second memory module, and align the data read out of the second memory module with an appropriate port.

In one aspect, the invention is a method of operating an interconnection network with a plurality of ingress ports and a plurality of egress ports, the method including receiving data at the plurality of ingress ports, retiming the received data, permuting the retimed data, realigning the permuted data, and providing the realigned data to the plurality of egress ports.

In another aspect, the present invention is a network node including a plurality of input ports, an input line card module in communication with the input ports, an interconnection network including a plurality of ingress ports in communication with the line card module, a retiming module, a permutation module in communication with the retiming module, and a realignment module in communication with the permutation module. Also included may be an allocator in communication with the permutation module and an output line card module in communication with the realignment module.

In yet another aspect, the present invention is an interconnection network including a plurality of ingress ports, a retiming module in communication with the input ports, a permutation module in communication with the retiming module, a realignment module in communication with the permutation module, an allocator in communication with the input ports, and a plurality of egress ports in communication with the realignment module.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

Embodiments of the present disclosure are directed to an interconnection network for routing or switching data traffic. As traffic traverses a network from an origination node to a destination node, it often passes through many intermediate nodes. With some exceptions, an intermediate node is not interested in using or modifying the traffic, but rather in forwarding it toward its destination. A given node, however, may function as both an intermediate node or as an origination or destination node.

Network nodes frequently have a number of ports for receiving or forwarding data traffic. A given physical port may service both as ingress port for receiving the data traffic and an egress port for forwarding, for example by using two (or more) different wavelengths for optical transmission.

Network nodes may take the form of or be referred to as routers, switches, bridges, hubs, and other names or devices. These devices may vary somewhat in function or capacity, but may all be used to implement the switching strategy described herein. An exemplary node is illustrated in FIG. 1.

Figure 1:
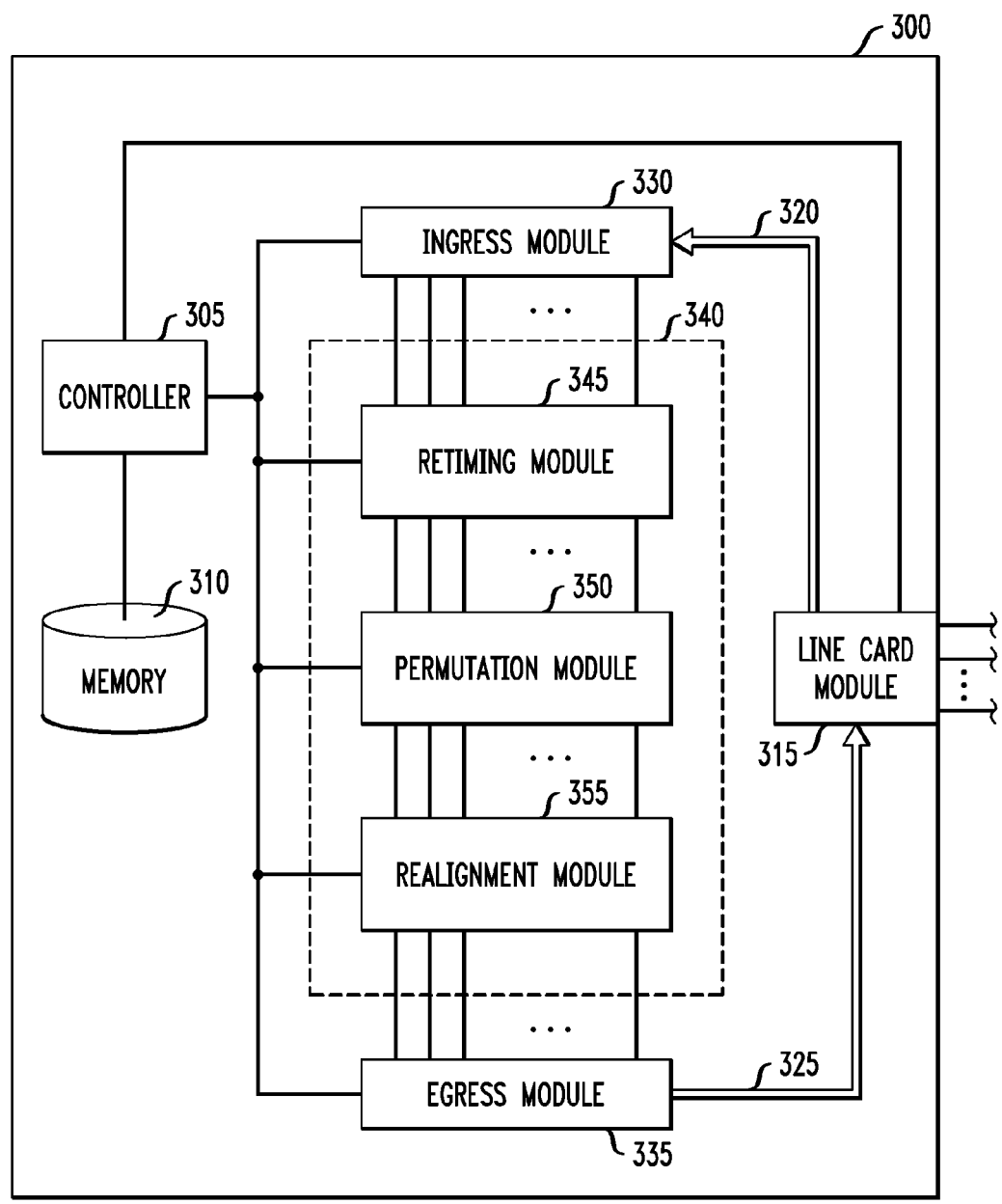
FIG. 1 is a simplified block diagram illustrating a network node according to an embodiment of the present invention.

FIG. 1 is a simplified block diagram illustrating a network node 300 according to an embodiment of the present invention. Network node 300 may be, for example, a network switch or router in any number of various implementations. In this embodiment, network node 300 includes a controller 305 and a memory device 310. In other embodiment, such as a chip, memory and a processor may be configured in analogous if not identical fashion.

Memory device 310 in this embodiment is a physical storage device that may in some cases operate according to stored program instructions. In any case, memory 310 is non-transitory in the sense of not being merely a propagating signal unless explicitly recited as such in a particular embodiment. Memory 310 is used for storing, among other things, program instructions for execution by controller 305. Controller 305 controls some of all of the components of network node 300, and may be implemented in hardware or hardware executing stored program instructions, or both. Note that although shown for convenience as single components, controller 305 and memory 310 may be a combination of several separate devices.

In the embodiment of FIG. 1, network node 300 also includes a line card module 315. Line card module 315 forms a network interface for the node, receiving data traffic and providing it to interconnector 340 via ingress module 330. Line card module 315 also receives processed data traffic from interconnector 340 via egress module 335 and forwards it on the communication network. In most implementations, line card module 315 includes a plurality of line cards associated with physical network input and output ports (not separately shown) that are used to place network node 300 in communication with other network elements (also not shown).

In this embodiment, ingress module 330 includes a number of ingress ports and an associated queue or queues (not separately shown). In FIG. 1, ingress bus 320 handles the communication between line card module 315 and the ingress queues of ingress module 330. Bus 320 is depicted in this manner as it typically handles traffic for the individual ingress ports that interface with interconnector 340. Bus 320 may be implemented, for example, as a ribbon cable. In this embodiment, in a similar manner egress module 335 includes a number of egress ports and an associated queue or queues (not separately shown). In FIG. 1, egress bus 325 handles the communication between line card module 315 and the egress ports of egress module 335.

In the embodiment of FIG. 1, interconnector 340 of network node 300 includes three interconnected modules, namely, retiming module 345, permutation module 350, and realignment module 355. Data traffic received from the ingress module passed through each in sequence and in the process is routed to the appropriate ports of egress module 335 and in turn the appropriate output port of line card module 315. An embodiment of the interconnector 340 will now be described in greater detail.

Figure 2:
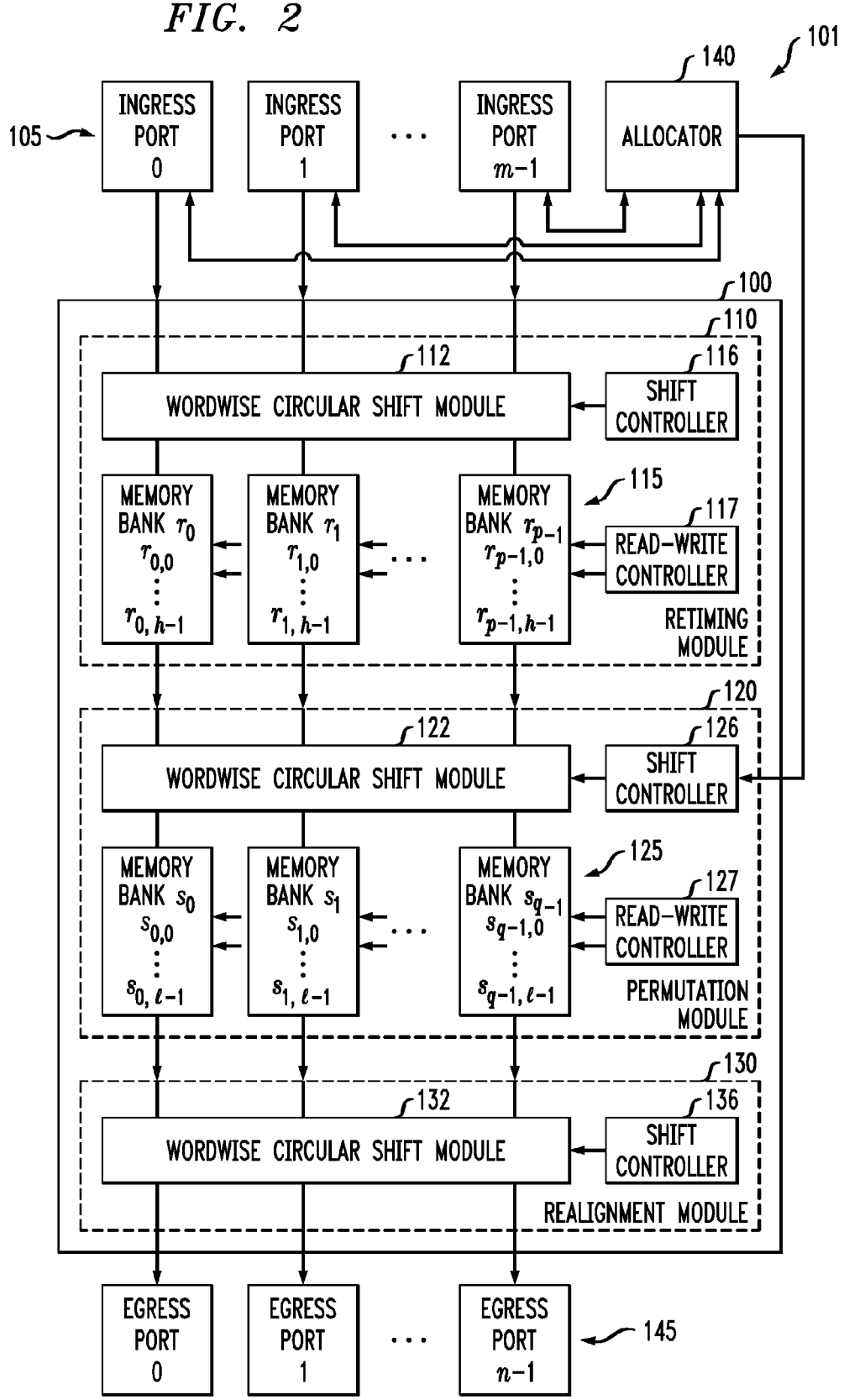
FIG. 2 is simplified block diagram illustrating an interconnector according to an embodiment of the present invention.

FIG. 2 is simplified block diagram illustrating an interconnector 100 and related components according to an embodiment of the present invention. In this embodiment, interconnector 100 includes a retimer module 110, a permutation module 120, and a realignment module 130, each delineated by broken lines within interconnector 100. Note, however, that this delineation, like that of interconnector 340 of FIG. 1, is for the purpose of convenience in description. The components considered within or without these modules may vary by implementation.

Also shown in FIG. 2 are ingress ports 105 (compare ingress module 330 in FIG. 1). In the embodiment of FIG. 2 there are m ingress ports referred to as ingress port 0 through ingress port m−1. As alluded to above the ingress ports 105 are typically associated with respective ingress queues (not separately shown in FIG. 2), and are in communication with a source of received data traffic (see, for example, FIG. 1). Similarly, there are n egress ports 145 (referred to here as egress port 0 through egress port n−1) that may be associated with respective egress queues. Interconnector 100 is between the ingress ports 105 and the egress ports 145, and along with any ingress and egress queues may be generally referred to as an interconnection network 101.

Note that for clarity, the terms "ingress ports" and "egress ports" will herein be associated with the interconnection network, and he terms "input ports" and "output ports" may then be used to refer to the device in which the interconnection network is resident, for example network node 300 illustrated in FIG. 1.

In the embodiment of FIG. 2, interconnection network 101 also includes an allocator 140. Allocator 140 aggregates routing information pertaining to the received data traffic and provides control signals to facilitate the flow of traffic through the interconnector 100 to appropriate egress ports. (An "appropriate" egress port is generally a port associated with the traffic's destination.)

In this embodiment, retimer module 110 includes a memory module 115, which here includes p memory banks referred to in FIG. 2 as memory bank $r_0$ through memory bank $r_{p-1}$, with p being greater than or equal to m, the number of ingress ports. Note that additional memory banks may be needed in some implementations, for example in the case of high-speed ports.

In operation, words are received sequentially at ingress ports and stored individually in separate memory banks, so each memory bank $r_0$ through $r_{p-1}$ is preferably large enough to hold at least a data word in each separately-addressable memory location. As used herein a "word" is generally the amount of data received at a given ingress port and stored in a given memory bank in a single clock cycle. In cases where one or more ingress ports operate at a relatively higher speed, "word" refers to the lowest-speed ingress port or ports. In notational form, a word contains w bits.

Each memory bank $r_0$ through $r_{p-1}$ preferably also includes at least enough memory locations to store a word from each input port. (Again, more (and in some cases fewer) memory locations may be required in some implementations.) In a preferred embodiment, at least one word from each ingress port is read into the memory banks of memory module 115 before any are read out in the next phase of the operation (assuming the data is available).

In the embodiment of FIG. 2, the retiming module 110 of interconnector 100 also includes a shift module 112, which in a preferred embodiment is a circular shift module such as a barrel shifter. Its operation is wordwise, meaning that the objects shifted are words of width w, which are kept intact and shifted by the width w each increment. It is circular in the sense that words reaching the end of the shift module in the direction of movement are shifted to back to the beginning. The number of steps each contemporaneous array of words at the ingress ports are shifted is determined by the shift controller 116.

In this embodiment, each memory bank $r_0$ through $r_{p-1}$ has h separately addressable memory locations, collectively referred to here as $r_{0,0}$ to $r_{p-1,h-1}$ representing $location_{bank,\ row}$. Note that the term "row" may but does not necessarily refer to a specific physical location within the memory. The location where a particular word is written to (or read from) is determined by the read-write controller 117. The reading and writing of received data words is discussed in more detail below.

In the embodiment of FIG. 2, the permutation module 120 of interconnector 100 includes a memory module 125, which includes q memory banks, referred to here as memory bank $s_0$ through memory bank $s_{q-1}$, with q being greater than or equal to m, the number of ingress ports. Each memory bank $s_0$ through $s_{q-1}$ has l separately addressable memory locations, collectively referred to here as $s_{0,0}$ to $s_{q-1,l-1}$ representing $location_{bank,\ row}$. Again, "row" can refer to a logical rather than physical location.

In accordance with this embodiment of the present invention, words read out of memory module 115 are selectively shifted and read into locations in memory banks $s_0$ through $s_{q-1}$ of memory module 115 in accordance with instructions received from read-write controller 127. A wordwise circular shift module 122 is present to selectively shift words read from memory module 115 according to instruction received from shift controller 126. In this embodiment, shift controller 126 in turn acts on instructions received from allocator 140. Note that in some embodiments the shift module 122 and shift controller 126 are optional, although they are present in preferred embodiments.

In the embodiment of FIG. 2, realignment module 130 includes a wordwise circular shift module 132 for selectively shifting words read from memory module 120 before they are provided to respective egress ports 145. In this embodiment there are n egress ports referred to as egress port 0 through egress port n−1. Shift module 130 operates under the control of shift controller 136. In alternate embodiments (not shown) where shift module 122 is not present, shift controller 136 in turn acts on instructions received from allocator 140.

In a preferred embodiment, the memory banks are RAM (random access memory) banks, and specifically SRAM (static RAM). In addition, (DP) dual port RAM that allows for reading from and writing to a given memory bank in a single clock cycle promote speed and efficiency in throughput.

FIG. 2 illustrates selected components of an embodiment and some variations are possible without departing from the invention as described herein and recited in the claims. Other variations are possible without departing from the claims of the invention as there recited. In some of these embodiments, illustrated components may be integrated with each other or divided into subcomponents. There will often be additional components in the device management server and in some cases less. The illustrated components may also perform other functions in addition to those described above.

Figure 3:
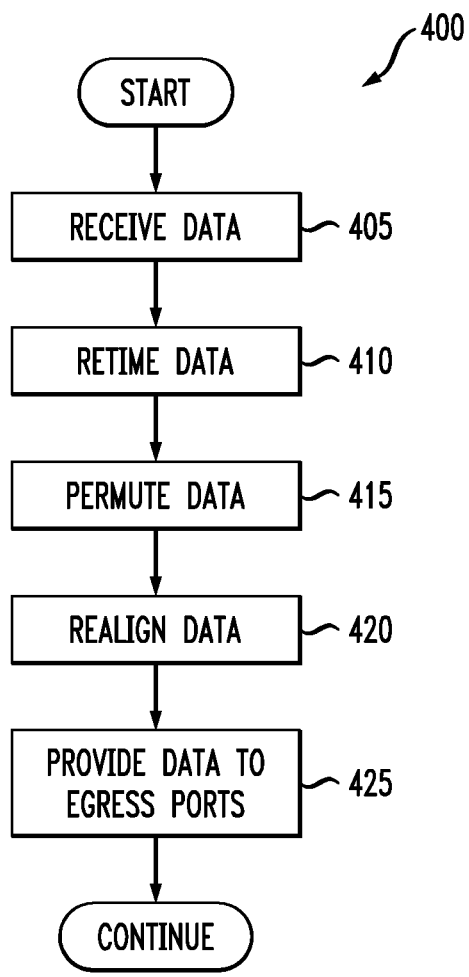
FIG. 3 is a flow diagram illustrating a method of interconnecting data traffic according to an embodiment of the present invention.

Operation of embodiments of the interconnector is now described in greater detail. FIG. 3 is a flow diagram illustrating a method 400 of interconnecting data traffic according to an embodiment of the present invention. At Start it is assumed that the required components are available and operable according to this embodiment. The process then begins when data is received at a plurality of ingress ports of an interconnection network (step 405). The data may have arrived, for example, at the input ports of a data router or other network node and, after determining its destination and next hop toward that destination, placed in an ingress queue for the interconnection network (steps not shown in FIG. 3).

In the embodiment of FIG. 3, the data received at the ingress ports is retimed (step 410). In the retiming module during retiming, the data is written into a memory module having a plurality of separately-addressable memory banks such that an entire array of contemporaneously arriving data words at the ingress ports may be stored, preferably in a single clock cycle. When this is accomplished, each word of an array arriving at time t is stored in a different memory bank of the retiming module.

Figure 4:
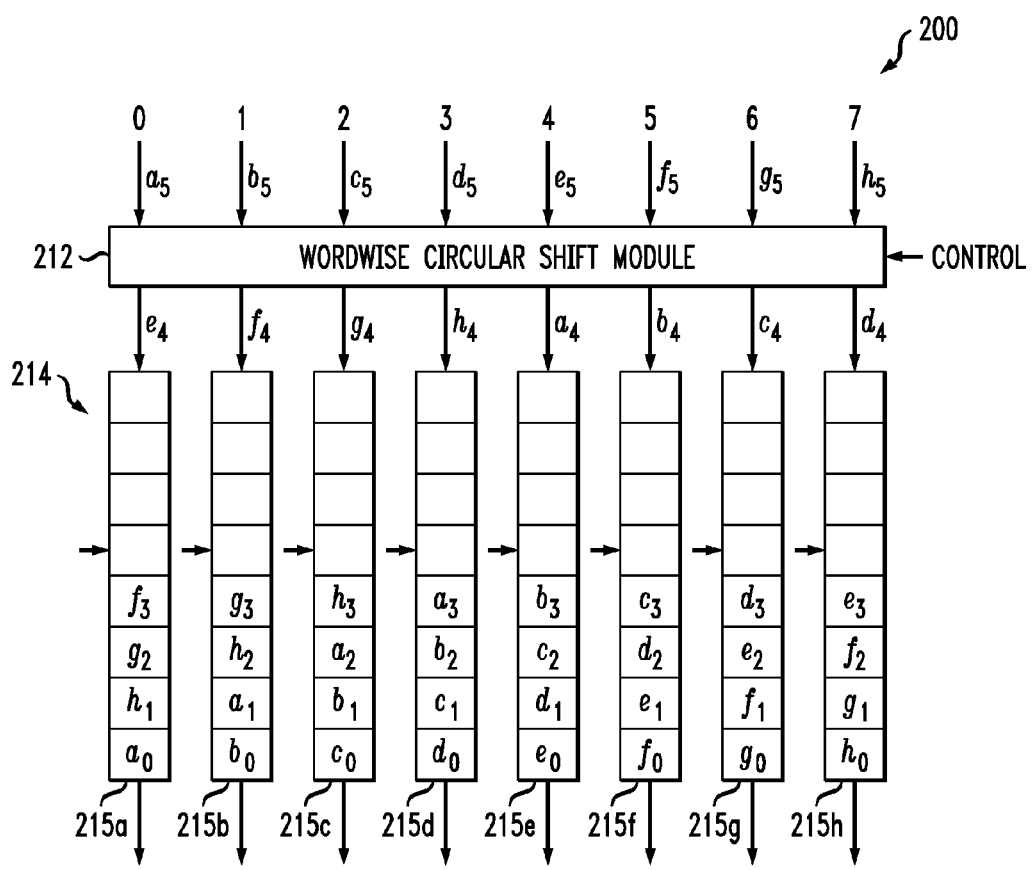
FIG. 4 is a simplified block diagrams illustrating operations of an interconnector according to embodiments of the present invention.

In this embodiment, during retiming (step 410) it is also desirable that each word of a sequential block is also placed in a different memory bank of the retimer memory module. This may be accomplished by selectively shifting each contemporaneously arriving array of words before writing to align the words in the array with different memory banks (not separately shown in FIG. 3). An example of this is shown in FIG. 4.

Note that the process of receiving and writing date is continuous, so long as there is data that must be routed through the interconnection network, but for convenience the processing of one set of data blocks will be described. A "block" is a sequence of words received at a given ingress port, and in most cases it refers to a sequence of m words, where m is the number of ingress ports. For clarity, the term "retimed set" will refer to a collection of sequential blocks stored in the retimer memory module and ready to be read out. Note, however, that when a retimed set has been written, some blocks may have fewer words than others by virtue of the fact that an ingress port may not always receive data continuously.

Figure 5:
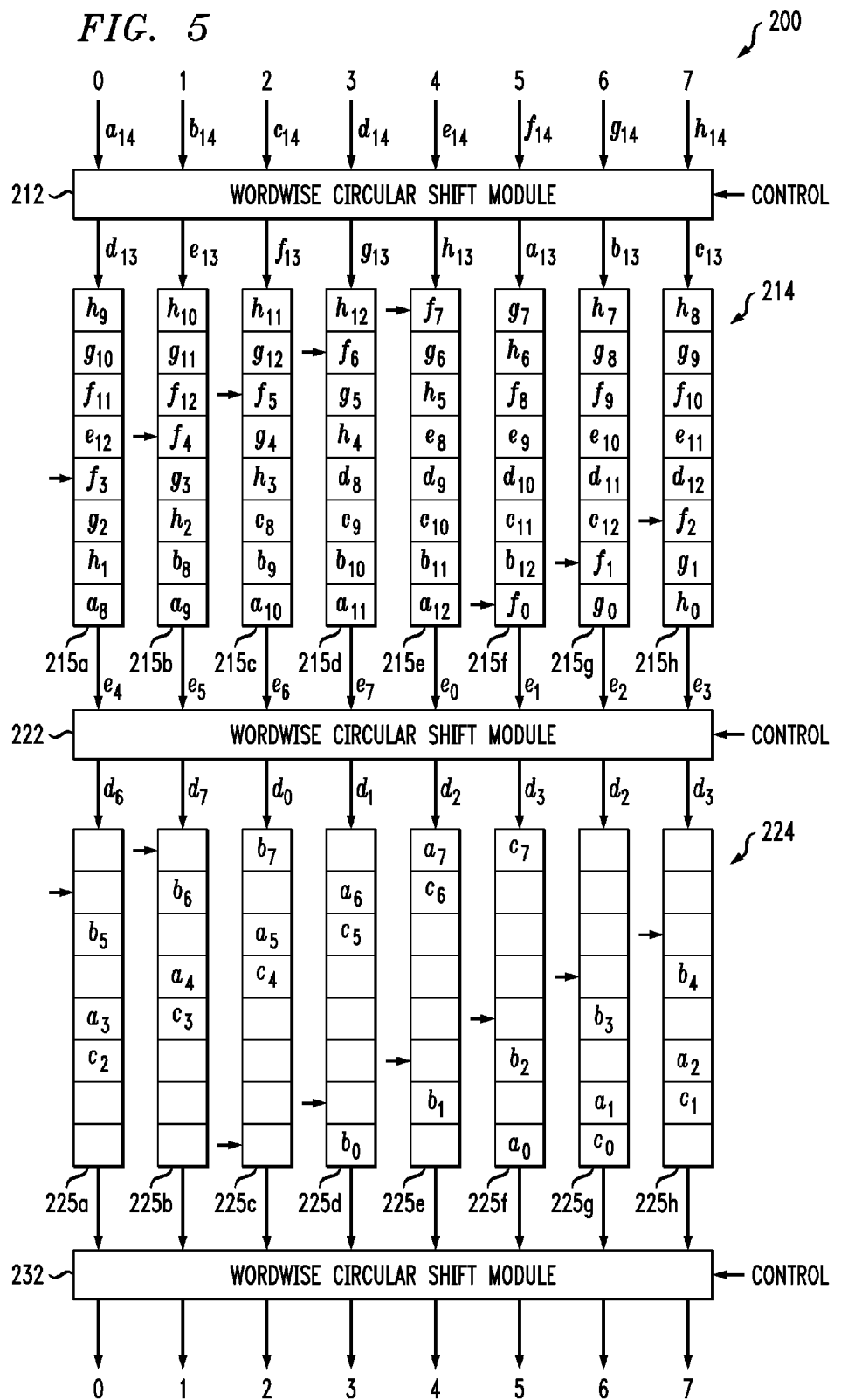
FIG. 5 is a simplified block diagrams illustrating operations of an interconnector according to embodiments of the present invention.

In the embodiment of FIG. 3, when a block of data has been written for some or all of the ingress ports, the retimed data is permuted (step 415). In this step, blocks of data (from the same ingress port) are read out of the retimer memory module and written into the plurality of memory banks forming the permution memory module. In a preferred embodiment, prior to writing, the data words of the block are selectively shifted to align them for efficient egress. An example of this is shown in FIG. 5.

In the embodiment of FIG. 3, the data is then realigned (step 420). In realignment, arrays of data are read out of the permutation memory module and selectively shifted before being provided to the egress ports at step 425. Each array read out during realignment includes a word from each of the ingress ports (if present), read out in the order in which they were received. In a preferred embodiment, the words of each array were positioned in the permutation memory module (in step 415) so that the shifting for realignment is easily achieved.

In FIG. 3, the process then continues with the throughput of additional data. As mentioned above, data throughput is preferably continuous. This may be accomplished in at least two ways, bearing in mind that it is desirable for a complete set of data to be formed in the retiming and permutation memory modules before the words of that set are read out of their current memory module.

In one embodiment, storage locations in the memory banks are rewritten as soon as the data has been read out of them, preferably in the same clock cycle. In another embodiment, one or both memory modules have sufficient storage locations so that data word sets are read out of one subset of memory while being written into the other.

Note that the sequence of operation illustrated in FIG. 3 represents an exemplary embodiment; some variation is possible within the spirit of the invention. For example, additional operations may be added to those shown in FIG. 3, and in some implementations one or more of the illustrated operations may be omitted. In addition, the operations of the method may be performed in any logically-consistent order unless a definite sequence is recited in a particular embodiment.

The operation of the interconnection network may be further illustrated by tracing exemplary data words as they are processed. FIGS. 4 and 5 are simplified block diagrams illustrating operations of an interconnector 200 of according to embodiments of the present invention. As should be apparent, interconnector 200 is similar if not identical to interconnector 100 illustrated in FIG. 2, and for convenience some similar components are analogously numbered.

Referring to FIG. 4, in this embodiment there are eight ingress ports (not shown, but indicated by arrows 0 through 7 into shift module 212). At present the data streams at these ingress ports 0 through 7 are indicated respectively as a through h. Data streams a through h are formed of a plurality of words, each having an index number to indicate the sequence in which they are received. Comparing with FIG. 2, it can be seen that FIG. 4 depicts the shift module 212 and memory module 214 portion of an interconnector retiming module.

As can be seen in FIG. 4, as data-word array $a_0$ through $h_0$ arrived at permutation memory module 214, it was written in to a first row of the plurality of memory banks $215_a$ through $215_h$. Note that each word was stored in a memory bank that is "aligned" with its respective ingress port. That is, the first array of words was not shifted. The second array $a_1$ through $h_1$, however, was shifted by one step such that, for example, $a_1$ was written into memory bank $215_b$ and $h_1$ was written into memory bank $215_a$. Second array $a_1$ through $h_1$ was written into a second row of memory module 214. This process continued as the third array $a_2$ through $h_2$ was written into memory module 214 after being shifted two steps.

In FIG. 4, also shown is a fifth array $a_4$ through $h_4$, which has been shifted four steps and is in the process of being written into a fifth row of memory module 214, each word into their respective memory bank as indicated by the small arrows pointed to those memory locations. Finally, a sixth array $a_5$ through $h_5$ is provided at the ingress ports 0 through 7 but has not yet been shifted.

In the embodiment of FIG. 4, a retimed set is being formed, which when complete will have one word from each ingress port in each memory bank $215_a$ through $215_h$. Note that as each array of words arrives, it is shifted a number of steps corresponding to the index indicating its sequential position in a block of words from the ingress port. The control of this portion of the process is in this case very simple and does not require knowledge of the destination of each data stream. If the eight memory bank rows of each memory are (in this embodiment) considered as $r_{0,0}$ through $r_{7,h-1}$ (see, for example, FIG. 2), then the write control according to each words index is also very simple. as should be apparent from the examples of FIGS. 4 and 5.

FIG. 5 depicts, in addition to the components shown in FIG. 4, the shift module 222 and the memory module 224 of the permutation module of interconnector 200. Also shown is the shift module 232 of the realignment module. The egress ports are not shown, but indicated by arrows 0 through 7 from the shift module 232. In this embodiment, it is noted that a routing rule has been imposed. That is, data traffic at ingress ports has been assigned a respective egress port to which it must be directed. Expressed as a permutation in two-line notation, the rule here is $$\sigma = \begin{pmatrix} 0 & 1 & 2 & 3 & 4 & 5 & 6 & 7 \\ 5 & 3 & 6 & 2 & 0 & 4 & 7 & 1 \end{pmatrix},$$

that is, data from ingress port 1 is switched to egress port 5, ingress port 3 to egress port 2, and so on.

With this in mind, FIG. 5 illustrates, in a sense, two operational sequences beyond the initial retiming described above. The first of these is the permutation phase. When a retimed set has been stored in memory module 214, blocks of data words may be read out. In this embodiment, the words $a_0$ through $a_7$ are read out of memory module 214 and written into respective locations in the memory banks $225_a$ through $225_h$ of permutation memory module 224. Where the data has been written into the retimer memory module 214 as illustrated in FIG. 4, the first (a) block is read out, preferably in a single clock cycle, from the first memory location (row$_0$) of memory bank $215_a$, the next (or second, row$_1$) memory location of memory bank $215_b$, row$_3$ of bank $215_c$, and so on to the last memory location (row$_7$) of memory bank $215_h$. Subsequent blocks are similarly read beginning with the first location (row$_0$) of memory bank $215_b$, and the rest of the block from locations in rows 1 through 7, bearing in mind that memory bank $215_a$ will follow memory bank $215_h$ in the sequence. In this way the read operation of this embodiment is relatively straightforward.

In the embodiment of FIG. 5, the blocks are written into memory module 224 using a similar pattern (to that by which they were just read). That is, the first word of the block (for example, $a_0$) is written in the first memory location (row$_0$) of a memory bank; the next word of the block (for example, $a_1$) is written in the first memory location (row$_1$) of the next memory bank, and so forth, as illustrated in FIG. 5.

In this embodiment, however, prior to writing each block read from the retimer memory module 214 into the permutation memory module 224, the words of the block are selectively shifted to align the first word with the egress port at which this particular block will be provided for egress. As this decision requires knowledge of the permutation rule σ, the shift controller for the permutation module will in this embodiment need to be guided by control signals from the allocator. Shifting is then executed according to the difference between the ingress and the egress port. Note that in an alternate embodiment, the blocks need not be shifted at this stage, but may be written into memory banks aligned with the respective retimer memory bank from which the words were read. This alternative is not presently preferred.

The other additional operational sequence illustrated in FIG. 5 is the writing of the next retimer set into the memory module 214. The next block from ingress port 0, for example, will be referred to as $a_8$ through $a_{15}$. In some embodiments, sufficient additional memory is provided so that as the first memory sets are being read, the additional memory is being filled with the following set. And when the following set being read, the first memory locations are filled with subsequently received data. In this way, two memory subsets may then be used on an alternating basis. This does require additional memory, of course, but is a relatively simple solution.

In an alternate embodiment, the ingress traffic does not wait for the entire retimed set to be read out of memory module 214, but fills memory locations as soon as they are available. In this case it is generally preferred to use a RAM where a memory location can be read from and written to in the same clock cycle.

FIG. 5 illustrates how this may be done. As can be seen there, the memory locations made available when data words $a_0$ through $a_7$ have been read are used to store the next array $a_8$ through $h_8$. This continues as each block in this retimed set is read out. As should be apparent, the contents of the retimer memory module 214 include elements of the first retimed set as well as the second.

Note, however, that the second retimed set will not be read out (beginning with block $a_8$ through $a_{15}$) until the retimed set is complete. At that time, reading the first block $a_8$ through $a_{15}$ will be accomplished by reading locations in the first row of memory module 214. Note that when this is done the next array at the ingress ports, $a_{16}$ through $a_{23}$, may be read into this first row of memory module 214 (and the second array into the second row, and so on) in the fashion illustrated in FIG. 4. Note also that the retimer module writing procedure alternates for every retimed set, which is not expected to greatly increase the complexity of the shift and read-write controllers.

Where the retimer module is refilled in this fashion, however, the permutation module presents more of a challenge. In the embodiment of FIG. 5, for example, additional permutation module memory or advanced logic, or both, may be needed to accommodate the blocks being read from the retimer memory module 214.

In some alternate embodiments, the allocator or some other queue manager may be configured to ensure that once a given stream ends, other data words, if in queue, may move up "on the fly" to be read into the retimer memory module prior to when they normally would do so. That is, before a preceding retimer set has been completely read out.

In other alternate embodiments, multicast switching may be accomplished by partially filling the retimer set and reading out selected memory bank locations more than once, and writing them multiple times into the permutation memory module. When a set of data words is read out of the permutation memory module as described above, the multiple identical blocks of data word will be placed on more than one egress port. In some cases, the retiming set may leave memory locations unfilled to accommodate multiple readings of certain blocks for multicasting.

The processes described above carried out, for example, by a network node or an independent device, and may be implemented in hardware, software program instructions stored on a non-transitory computer readable medium and executable on a hardware device, or both. Although not preferred, in some embodiments, the software program instructions may in whole or in part also be stored in or represented by a propagating signal.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A method of operating an interconnection network with a plurality of ingress ports and a plurality of egress ports, comprising:
   receiving data at the plurality of ingress ports;
   retiming the received data by writing data words received at the plurality of ingress ports in a first plurality of memory banks until a retimed set has been written; wherein, prior to writing, each successive data-word array is selectively shifted such that each word received from a given ingress port is in a different memory bank;
   permuting the retimed data;
   realigning the permuted data; and
   providing the realigned data to the plurality of egress ports.

2. The method of claim 1, wherein permuting the data comprises—
   reading successive arrays of data words from a first plurality of memory banks, wherein each successive array of data comprises data words from the same ingress port; and
   writing each array of data words in a second plurality of memory banks such that each word received from a given ingress port is in a different memory bank.

3. The method of claim 2, further comprising, prior to writing into the second plurality of memory banks, shifting each array of data words so that the earliest word received is aligned with its intended egress port.

4. The method of claim 2, wherein realigning the permuted data comprises—
   reading successive arrays of data words from the second plurality of memory banks, wherein each successive array of data comprises data words from different ingress ports;
   selectively shifting each array of data words to align each word with its intended egress port; and
   providing the selectively shifted data words to the plurality of egress ports.

* * * * *